United States Patent
Yang

(10) Patent No.: US 8,433,847 B2
(45) Date of Patent: Apr. 30, 2013

(54) MEMORY DRIVE THAT CAN BE OPERATED LIKE OPTICAL DISK DRIVE AND METHOD FOR VIRTUALIZING MEMORY DRIVE AS OPTICAL DISK DRIVE

(75) Inventor: In Chang Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 264 days.

(21) Appl. No.: 12/937,131

(22) PCT Filed: Apr. 13, 2009

(86) PCT No.: PCT/KR2009/001887
§ 371 (c)(1),
(2), (4) Date: Oct. 21, 2010

(87) PCT Pub. No.: WO2009/126011
PCT Pub. Date: Oct. 15, 2009

(65) Prior Publication Data
US 2011/0035543 A1 Feb. 10, 2011

(30) Foreign Application Priority Data
Apr. 11, 2008 (KR) .................. 10-2008-0033643

(51) Int. Cl.
*G06F 12/00* (2006.01)
(52) U.S. Cl.
USPC .... 711/105; 711/103; 711/112; 711/E12.001; 711/E12.008
(58) Field of Classification Search .................. 711/103, 711/105, 112, E12.001, E12.008
See application file for complete search history.

(56) References Cited

U.S. PATENT DOCUMENTS

| | | | |
|---|---|---|---|
| 5,778,418 A | 7/1998 | Auclair et al. | |
| 7,788,427 B1 * | 8/2010 | Yang | 710/62 |
| 2003/0200385 A1 | 10/2003 | Abrams | |
| 2006/0224851 A1 * | 10/2006 | Tamura et al. | 711/170 |
| 2006/0248387 A1 | 11/2006 | Nicholson et al. | |
| 2007/0247995 A1 | 10/2007 | Park et al. | |
| 2008/0046641 A1 | 2/2008 | Lasser | |
| 2008/0052461 A1 | 2/2008 | Kavian | |

\* cited by examiner

*Primary Examiner* — Jasmine Song
(74) *Attorney, Agent, or Firm* — Birch, Stewart, Kolasch & Birch, LLP

(57) ABSTRACT

The present invention relates to a memory drive that can be virtualized as an optical disk drive and a virtualizing method thereof. One embodiment of the present invention discloses a method for virtualizing a memory drive as an optical disk drive, the memory drive comprising a storage memory and a storage memory controller, which reads or writes data from and to the storage memory. Therefore, according to one embodiment of the present invention, a solid-state which comprises a flash memory and a flash memory controller can be used like an optical disk.

25 Claims, 8 Drawing Sheets

MEMORY DRIVE THAT CAN BE OPERATED LIKE OPTICAL DISK DRIVE AND METHOD FOR VIRTUALIZING MEMORY DRIVE AS OPTICAL DISK DRIVE

TECHNICAL FIELD

The present invention relates to a memory drive capable of being virtualized as an optical disk drive and a method of virtualizing the same. The present invention can control the data writability of the memory drive according to the type of optical disk drive. Accordingly, the present invention relates to a memory drive capable of operating like an optical disk drive and a method of virtualizing the same.

BACKGROUND ART

A flash memory is a non-volatile memory like a hard disk, has fast access speed, and consumes less power, and thus it is widely used in a built-in system, a portable device, and the like.

To perform a writing operation upon a memory sector that has been already written, the flash memory must perform an operation of erasing the entire block including the corresponding sector in terms of its hardware characteristics. Partial programming, in which data is written to a part of pages that constitute a flash memory block, is possible.

A solid state drive is a device for storing information using a semiconductor and is abbreviated as "SDD". The SSD operates in substantially the same manner as a hard disk drive (HDD). Since the SSD is compatible with ATA interface, it is easy to substitute the existing HDD with the SSD. Moreover, since the SDD has no portion that mechanically moves, it significantly reduces the problems associated with the SDD, such as long search time (seek time), latency, mechanical delay, and failure.

The SSD is also called a flash drive. The SSD based on flash memory does not require a battery and can be used as a substitute for 1.8, 2.5, and 3.5 inch HDDs. Since the SSD uses a non-volatile memory, data is not damaged even in the event of a sudden power failure. The flash memory is slower than DRAM but can operate at a higher speed than the currently used HDD.

FIG. 1 is a diagram showing a structure of an SSD, which comprises a plurality of flash memories 10 capable of storing data that a host 30 wants to write and a flash controller 20 that accesses the flash memory 10 to write or read data.

The flash controller 20 comprises a host interface 21 transmitting and receiving data to and from the host 30, a flash memory interface 23 transmitting and receiving data to and from the flash memory 10, and a microprocessor 22 managing a file system of the flash memory 10 and mapping a logical address to a physical address when data is written or read.

However, the SSD can write and erase data at all time. Thus, data may be easily erased even in the case where data is written to the SSD and released for distribution. Moreover, unlike the optical disk drive, the SSD has a problem that data should be transferred to the host and retained therein even in the case where data is to be stored.

A memory drive comprising a storage memory such as a hard disk (HD) or MRAM and a storage memory controller also can write and erase data at all time. Accordingly, the memory drive also has the problem that data can be easily erased even in the case where data is written to the memory drive for distribution.

Moreover, in the case of a memory drive that includes the SSD has a problem that cannot be used in an electronic device that uses an optical disk drive.

DISCLOSURE

Technical Problem

The present invention allows a host to access a memory drive, which stores data in a memory, like an optical disk drive. The present invention virtualizes the memory drive as the optical disk drive by controlling the data writability of the memory drive. The present invention allows the memory drive to store data in the same manner as the optical disk drive. According to an embodiment of the present invention, a solid state drive (SSD) can be virtualized and used as the optical disk drive.

Technical Solution

In one aspect, the present invention provides a memory drive capable of being virtualized as an optical disk drive, the memory drive including a storage memory and a storage memory controller for writing data to the storage memory, in which the storage memory controller writes or reads data to or from the storage memory based on a unit of writing/reading in accordance with an optical disk drive standard.

In another aspect, the present invention provides a solid state drive capable of being virtualized as an optical disk drive, the solid state drive including a flash memory and a flash controller for writing data to the flash memory, in which the flash controller writes or reads data to or from the flash memory based on a unit of writing/reading in accordance with an optical disk drive standard.

In another aspect, the present invention a solid state drive capable of being virtualized as an optical disk drive, the solid state drive including a flash memory and a flash controller for writing data to the flash memory, in which the flash controller includes: a sector manager for managing a unit of writing/reading of the flash memory based on a unit of writing/reading in accordance with an optical disk drive standard; an attribute manager for controlling the data writability of the solid state drive and transmitting attribute information related to the data writability of the solid state drive to the host; and a write/read controller for writing or reading data to or from the flash memory based on the unit of writing/reading set by the sector manager in response to a write/read operation request from the host according to the attribute information.

In still another aspect, the present invention provides a method of virtualizing a memory drive as an optical disk drive, the memory drive including a storage memory and a storage memory controller that writes data to the storage memory, the method including the steps of: transmitting attribute information related to the data writability of the memory drive in response to a device recognition request from a host; and writing or reading data to or from the storage memory based on a unit of writing/reading in accordance with an optical disk drive standard in response to a write/read operation request from the host according to the attribute information.

In yet another aspect, the present invention provides a method of virtualizing a solid state drive as an optical disk drive, the solid state drive including a flash memory and a flash controller that writes data to the flash memory, the method including the steps of: transmitting attribute information related to the data writability of the solid state drive in response to a device recognition request from a host; and writing or reading data to or from the flash memory based on a unit of writing/reading in accordance with an optical disk drive standard in response to a write/read operation request from the host according to the attribute information.

Advantageous Effects

According to the present invention, a memory drive can be virtualized as an optical disk drive. Thus, a user can use the memory drive comprising an HD, MRAM, or flash memory as the optical disk drive. Moreover, it is possible to enhance the user's convenience by providing substantially the same physical characteristics as the optical disk drive to the memory drive.

Further, the memory drive according to the present invention operates in substantially the same manner as the optical disk drive, and thus it can be applied to any device regardless of the operating system. For example, in the case where the memory drive virtualized as the optical disk drive by the present invention is connected to a PC through a USB, it can be recognized as a RAM or ROM storage device. In this case, the memory drive according to the present invention can be recognized as a CD-ROM released for advertisement or sales promotion. As another example, in the case where the memory drive is connected to a camcorder that uses an optical disk drive through a USB, it can be recognized as a DVD.

Moreover, since the memory drive is a virtual optical disk drive, there are no limitations such as size limits, access speed limits, physical disk recognition time, etc. which are caused when the optical disk drive operates.

Furthermore, according to the present invention, a solid state drive (SSD) can be virtualized as an optical disk drive. Accordingly, it is possible to access the SSD according to the manner in which a host accesses the optical disk drive. Also, it is possible to control the erasability and rewritability of data written to the SSD. Thus, the written data can be stored for a long time. Further, the SSD can be connected to a device, in which an optical disk drive is used, and used therein. The SSD has a size smaller than that of the optical disk drive. Thus, it is possible to reduce the size of the device in which the optical disk drive is used. In addition, it is possible to reduce power consumption compared to the case where data is managed in the optical disk drive.

BEST MODE

Figure 1:
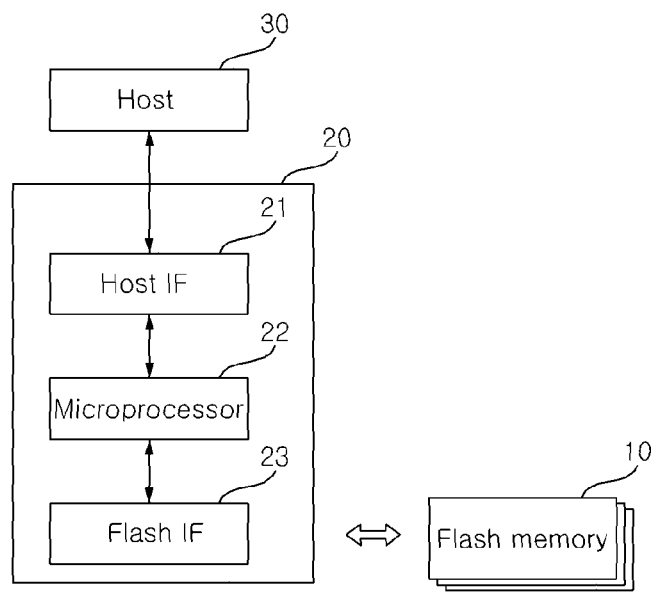
FIG. 1 is a block diagram showing a structure of a solid state drive.

Hereinafter, the present invention will now be described more fully with reference to the accompanying drawings, in which exemplary embodiments of this invention are shown. Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

An embodiment of the present invention provides a solid state drive which is a memory drive using flash memory. However, the present invention can be applied to a memory drive comprising various types of storage media such as HD, MRAM, etc. Thus, a method of virtualizing a memory drive as an optical disk drive besides the solid state drive will be considered to fall within the scope of the present invention.

Figure 2:
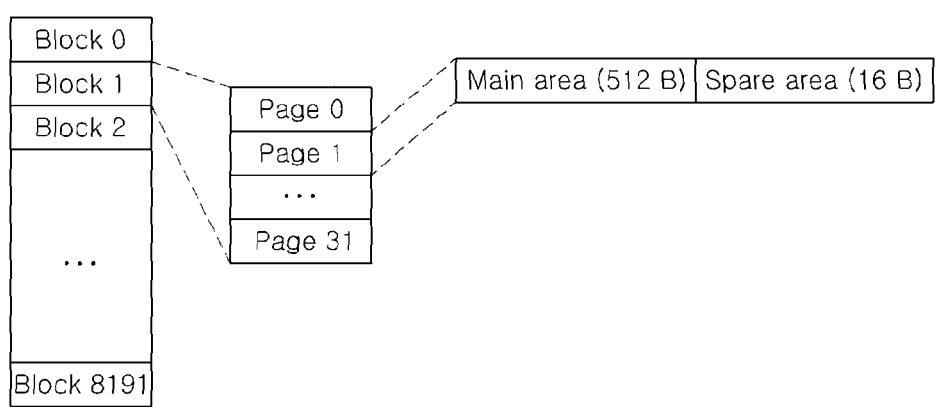
FIG. 2 is a diagram showing a structure of a flash memory in accordance with an embodiment of the present invention is applied.

FIG. 2 shows a structure of a flash memory. As shown in FIG. 2, one flash memory comprises 8,192 blocks. Each block comprises 32 pages, and each page can be divided into a main area of 512B and a spare area of 16B. User data is written to the main area, which can be considered as a set of sectors. Information related to whether or not the data written to the main area is valid, or information related to ECC, Logical Block Address (LBA), or Logical Sector Number (LSN), the number of times of erasing, and the like is written to the spare area.

FIG. 2 shows a small block flash memory in which a unit of writing/reading of the flash memory coincides with a unit of writing/reading requested by an external host. However, the present invention can be applied to a large block flash memory in which a unit of writing/reading of the flash memory is greater than a unit of writing/reading requested by an external host. In the case of the large block flash memory, the main area comprises four sectors. Data is written to the large block flash memory in units of sectors or pages.

Figure 3:
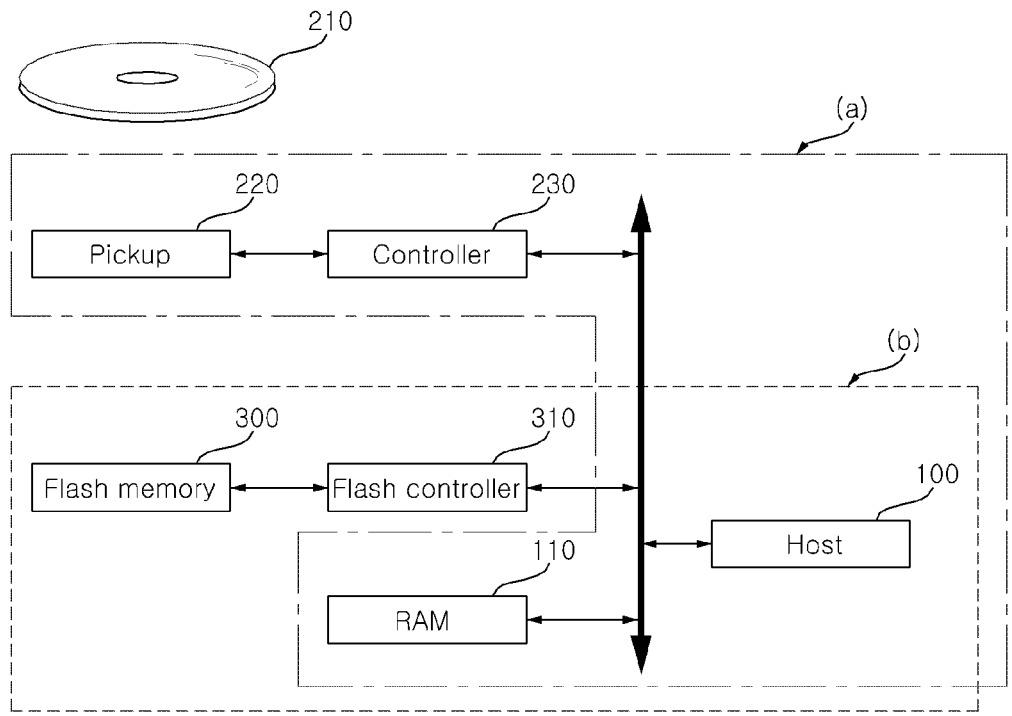
FIG. 3 is a block diagram showing a structure of a solid state drive virtualized as an optical disk drive in accordance with an embodiment of the present invention.

FIG. 3 is a block diagram showing a structure of a solid state drive virtualized as an optical disk drive in accordance an embodiment of the present invention. In FIG. 3, (a) shows a host 100 and an optical disk drive transmitting and receiving data. The optical disk drive comprises an optical disk 210, a pickup 220, and a controller 230. The present invention is shown in (b) of FIG. 3. In FIG. 3, (b) shows a solid state drive that the host 100 can access in the same manner as the optical disk drive. The solid state drive comprises a flash memory 300, to and from which data is written, read, and erased, and a flash controller 310.

The flash controller 310 writes or reads data to or from the flash memory 300 in response to a write/read operation request from the host 100. A RAM 110 serves as a buffer while the host 100 writes or reads data to or from the solid state drive.

The flash controller 310 transmits attribute information of the solid state drive to the host 100 in response to a device recognition request from the host 100. The solid state drive is virtualized as an optical disk drive. Thus, the flash controller 310 transmits information related to the type of the optical disk drive, to which the solid state drive has been virtualized, to the host 100.

The host 100 analyzes the information transmitted from the flash controller 310 and recognizes the solid state drive as an optical disk drive. The types of optical disk drives, to which the solid state drive can be virtualized, may include a read-only memory (ROM) disk drive, a recordable disk drive, a rewritable disk drive, and a random-access memory (RAM) disk drive.

The flash controller 310 controls the data writability of the solid state drive based on the attribute assigned to the solid state drive. The host 100 recognizes the solid state drive as an optical disk drive and requests a data write/read operation to the flash controller 310.

The flash controller 310 is an example of a storage memory controller that writes data to a storage memory such as flash memory or reads data written to the storage memory and transmits the same to the host 100. The storage memory controller writes data to the storage memory or reads data written to the storage memory by applying a file system in accordance with an optical disk drive standard to the storage memory, executes optical disk drive processing instructions of the host using processing instructions in accordance with the optical disk drive standard, and returns the result or state with respect to an instruction from the host to the host.

The type of data written to the storage memory in the storage memory is the same as the type of data written to the optical disk drive.

Virtualization in accordance with an embodiment of the present invention, i.e., an emulation process means a process of executing the memory drive comprising the storage memory as a virtual optical disk drive. Thus, it is necessary to assign attribute information of the optical disk drive to the memory drive.

To perform the emulation, the file system that manages files of the optical disk drive should be applied to the memory drive in the same manner. Moreover, the instructions that process the optical disk drive should be used in the memory drive in the same manner.

Advanced Technology Attachment Packet Interface (ATAPI) may be used as the optical disk drive processing instructions. Examples of ATAPI which can be applied to the memory drive of the present invention are as follows.

A "Get configuration" command that returns profile information of the memory drive (e.g., type, size, power control characteristics, etc.) as virtual disk information, a "Text Unit Ready" command that returns a drive ready state, a "Read Capacity" command that returns the maximum capacity of the disk, a "Read TOC/PMA/ATAPI" or "Read Disk Information" command that returns virtually established track/session information, a "Read Track Information" command that returns detailed information of tracks, a "Read" command that maps a specific address area of the storage memory, which constitutes the memory drive, to a specific area of an optical disk so as to be recognized as the optical disk, a "Write and Verify" command that maps a specific address area of the storage memory to a specific area of the optical disk so as to write data, and the like may be used.

Moreover, it is necessary to investigate the properties such as the disk attribute (whether the disk drive is a ROM or R/RW disk drive), disk size, detailed properties of the disk (track, session information, etc.), read/write information, and the like, so that the memory drive may be emulated as the optical disk drive.

One of the features of the memory drive virtualized as the optical disk drive by the present invention is that the memory drive can operate in substantially the same manner as the optical disk drive. Thus, data can be written or read to or from any device in the same manner as the optical disk drive regardless of the operating system of the host. For this purpose, the storage memory controller transfers a file management system applied to the optical disk drive to the memory drive as it is and manages the same.

MODE FOR INVENTION

A method of writing and reading data to and from a solid state drive comprising a flash memory and a flash controller in accordance with an embodiment of the present invention will be described below.

Figure 4:
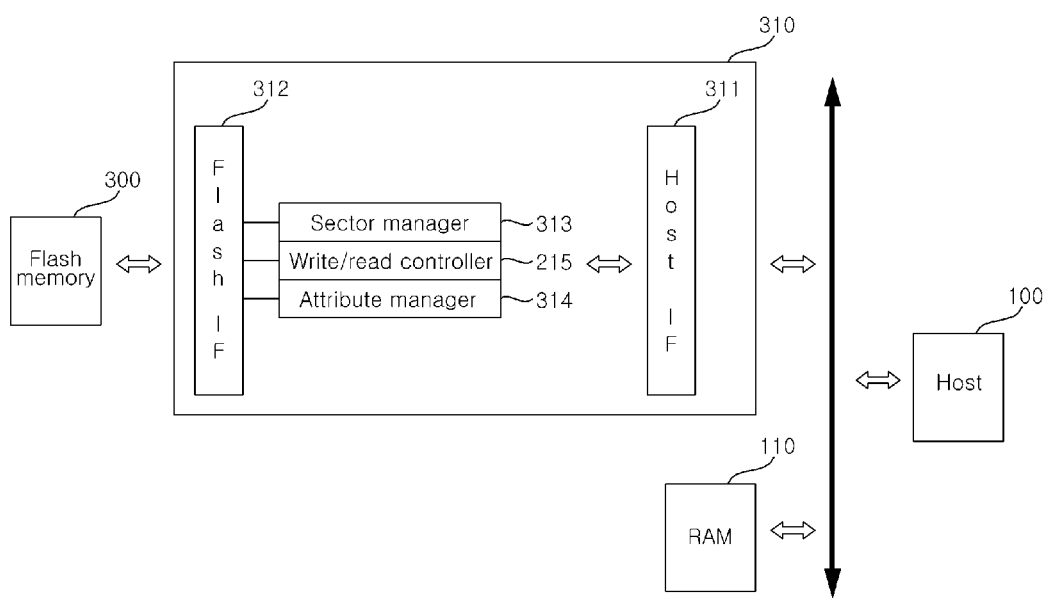
FIG. 4 is a block diagram showing a structure of a flash controller 310 of FIG. 3.

FIG. 4 is a diagram showing the inside of the flash controller of the present invention. The flash controller 310 includes a host interface 311 and a flash interface 312. Further, the flash controller 310 includes a sector manager 313, an attribute manager 314, and a write/read controller 315.

The sector manager 313 manages a unit of writing/reading of the flash memory 300 based on a unit of writing/reading in accordance with the optical disk drive standard. The write/read controller 315 writes or read data to or from the flash memory 300 based on the unit of writing/reading managed by the sector manager 313.

The attribute manager 314 manages attribute information assigned to the solid state drive. The attribute information may be stored in the flash memory 300 or in a RAM in the flash controller 310. The attribute manager 314 transmits the attribute information to a host 100 in response to a device recognition request from the host 100. The host 100 recognizes the solid state drive as one of the optical disk drives based on the attribute information transmitted from the attribute manager 314.

The attribute manager 314 controls the data writability of the solid state drive based on the assigned attribute information. If the solid state drive is a read-only memory (ROM) disk drive, data cannot be written to the solid state drive. Thus, the write/read controller 315 cannot write the data to the flash memory 300 even in the case where the host 100 requests a data write operation.

A user can directly set up or change the attribute information in the solid state drive. The solid state drive of the present invention may include a jumper switch capable of changing the attribute information. The attribute manager 314 determines the type of optical disk drive, to which the solid state drive is virtualized according to the switched state of the jumper switch, and controls the data writability thereof.

Besides the jumper switch, a command to change the attribute information may be input to the attribute manager 314. The attribute manager 314 may change the attribute information based on the input command. If necessary, the attribute information may be fixed during manufacturing of the solid state drive so as not to be changed. Otherwise, a password may be requested to change the attribute information. In this case, the user cannot change the attribute information without the password.

Figure 5:
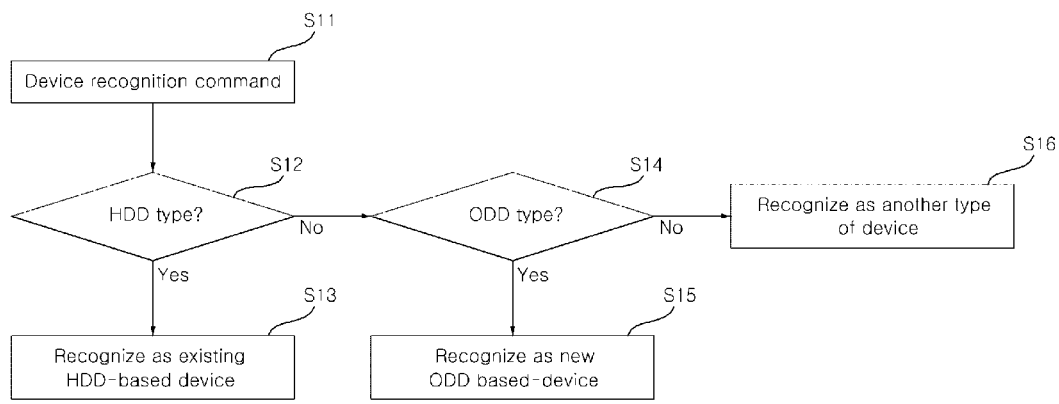
FIG. 5 is a flowchart showing how a host recognizes the solid state drive in accordance with an embodiment of the present invention as an HDD or ODD.

FIG. 5 is a diagram showing how the host 100 recognizes the solid state drive. The host 100 sends a device recognition request to a device (S11). The host 100 determines whether the device is a hard disk drive based on a signal transmitted from the device in response to the device recognition request (S12). If the solid state drive is virtualized as the hard disk drive in an ordinary manner, the host 100 recognizes the device as the hard disk drive (S13).

If the device is not a hard disk drive, the host 100 determines whether it is an optical disk drive (S14). When the solid disk drive is virtualized as the optical disk drive according to the present invention, the host 100 recognizes the solid state drive as an optical disk drive (S15).

If the device is neither a hard disk drive nor an optical disk drive, the host 100 recognizes the device as another type of device (S16).

Figure 6:
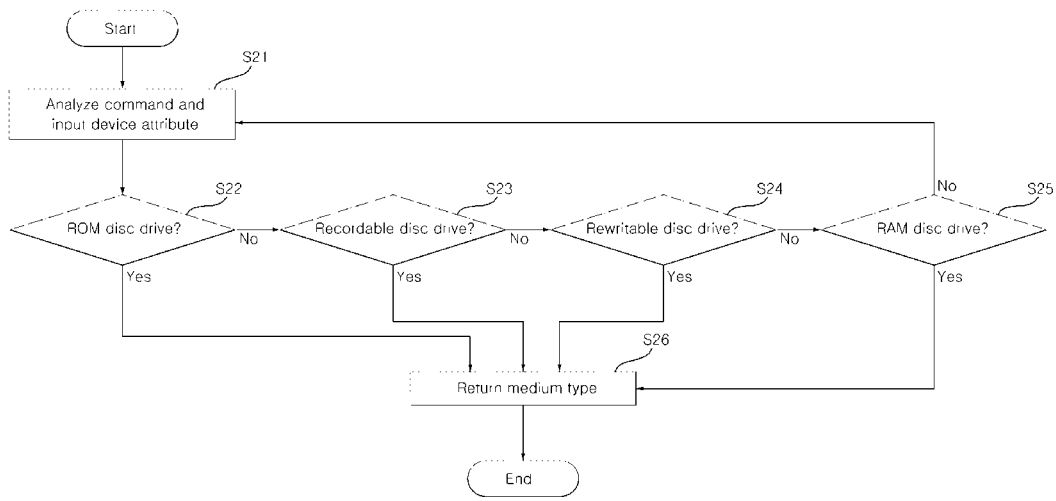
FIG. 6 is a flowchart showing how the solid state drive in accordance with an embodiment of the present invention transmits information related to the type of virtualized optical disk drive to the host.

FIG. 6 is a diagram showing how the solid state drive operates in response to a device recognition request transmitted from the host 100.

When the host 100 sends a device recognition request, the flash controller 310 analyzes the received request (S21). If it is analyzed as the device recognition request, the type of optical disk drive, such as ROM disk drive, recordable disk drive, rewritable disk drive, or RAM disk drive, to which the solid state drive is virtualized, is determined by the attribute manager 314 (S22 to S25).

The flash controller 310 transmits the attribute information to the host 100. The host 100 recognizes the type of optical disk drive to which the solid state drive is virtualized based on the attribute information and requests a data write or read operation based on its characteristics.

The host 100 that has recognized the solid state drive as an optical disk drive accesses a sector or address of a virtual drive through a logical address (LSN or LBA). A physical address (PSN or PBA) is assigned to the flash memory 300 in units of pages or sectors.

When the host 100 requests a data write or read operation, the flash controller 310 writes or read data to or from the flash memory 300 by mapping the logical address to the physical address.

Figure 7:
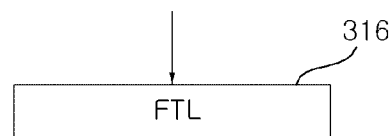
FIG. 7 is a diagram showing a layer of mapping a logical-physical address in the solid state drive in accordance with an embodiment of the present invention.

FIG. 7 shows a Flash Translation Layer (FTL) 316, which is a logical to physical mapping layer included in the flash controller 310. In this embodiment, the write/read controller 315 performs an FTL function.

Figure 8:
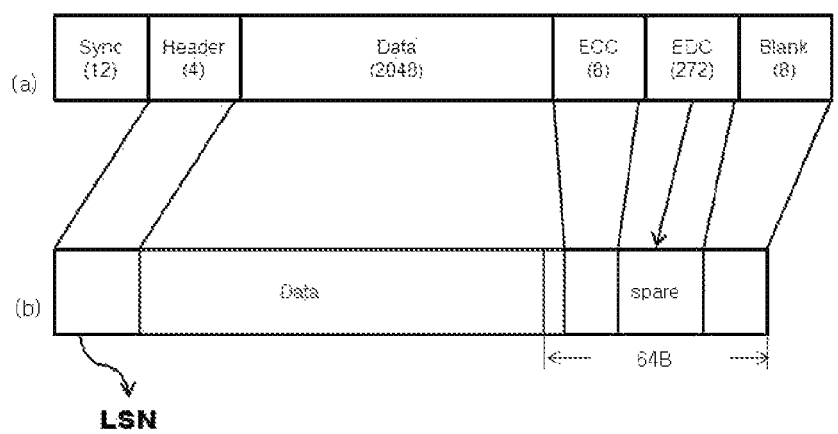
FIG. 8 is a diagram showing a method of matching a flash memory of the solid state drive in accordance with an embodiment of the present invention with a unit of sector of an optical disk drive.

FIG. 8 shows a sector (a) of a unit of writing/reading in an optical disk drive and a page (b) in a 2K flash memory. As shown in FIG. 8, a data write area of the sector (a) of the optical disk drive has been standardized. The sector manager 313 manages the page (b) of the flash memory like the sector (a) of the optical disk drive.

The write/read controller 315 writes or reads data to or from the page (b) virtualized like the sector (a) of the optical disk drive through the sector manager 313.

The 2K flash memory has a spare area of 64B, which is smaller than the margin (ECC, EDC, and Blank) of the optical disk drive as shown in FIG. 8. However, during data write and read, the error occurrence probability of the flash memory is lower than that of the optical disk drive. Thus, the flash memory may have a smaller margin than the optical disk drive.

Figure 9:
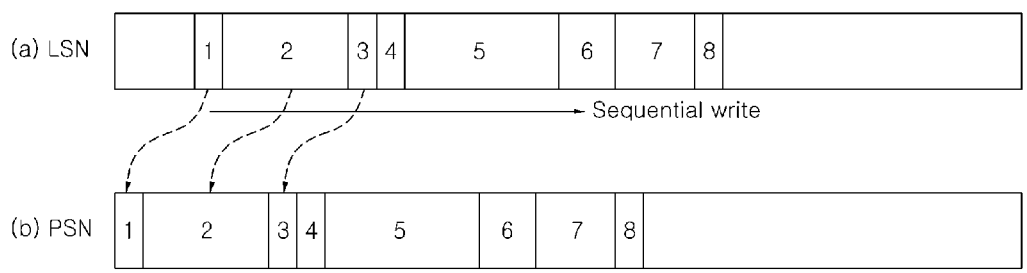
FIGS. 9 to 16 are diagrams showing a method of writing data to the flash memory in accordance with an embodiment of the present invention.
Figure 10:
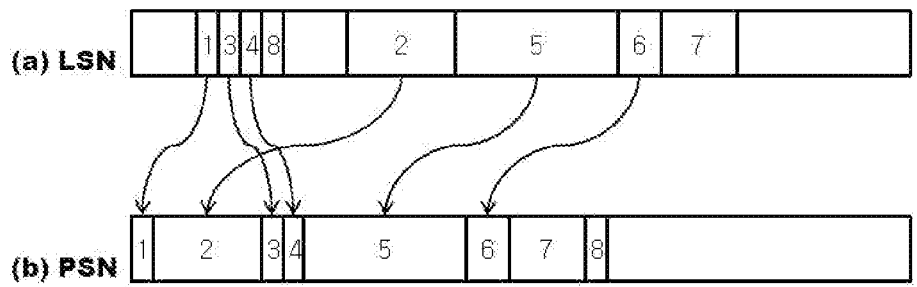

FIGS. 9 and 10 show examples in which the host 100 writes data to a page.

FIG. 9 shows an example in which the host 100 sequentially accesses a logical address in the manner shown in (a) of FIG. 9 during data write. In this case, the write/read controller 315 sequentially writes data to a physical address having a size different from that of the logical address searched in the manner shown in (b) of FIG. 9.

Since the write/read controller 315 sequentially writes data to the flash memory 300 in the same manner as the optical disk drive, it is not necessary to generate a mapping table that maps the logical address to the physical address. In FIG. 9, the write/read controller 315 writes or reads data to or from the flash memory 300 based on the difference between the logical address and the physical address.

FIG. 10 shows an example in which the host 100 randomly searches the logical address in the manner shown in (a) of FIG. 10 during data write. In this case, the write/read controller 315 temporarily stores data, which will be written to the flash memory 300, in a buffer in the flash controller 310 and then sequentially writes the data to a physical page (b). The write/read controller 315 generates and stores a mapping table that maps the logical address to the physical address.

When updating data written to the logical address, the write/read controller 315 accesses the mapped physical address and invalidates the data. Then, the write/read controller 315 writes data to a new physical address and updates the logical to physical address mapping table to the new physical address.

In the case of the optical disk drive, a file system such as UDF or ISO9660 is generally used. FIGS. 11 to 16 show a method of writing data to the flash memory 300, in which a file is divided into a file system area and a data area like the optical disk drive, when the corresponding file is written to the flash memory 300.

Figure 11:
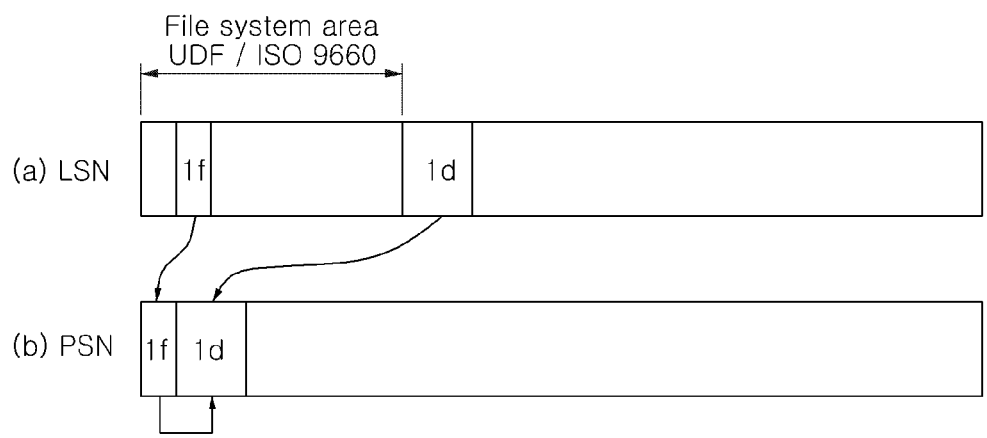

FIG. 11 shows an example in which a first file, divided into a file system area and a data area as shown in (a), is written to a flash memory (b). The write/read controller 315 may sequentially access the physical address of the flash memory (b) and read data. Thus, it is possible to sequentially write data $1f$ corresponding to the file system area of (a) and data $1d$ corresponding to the data area to the flash memory 300 as shown in (b) of FIG. 11.

Figure 12:
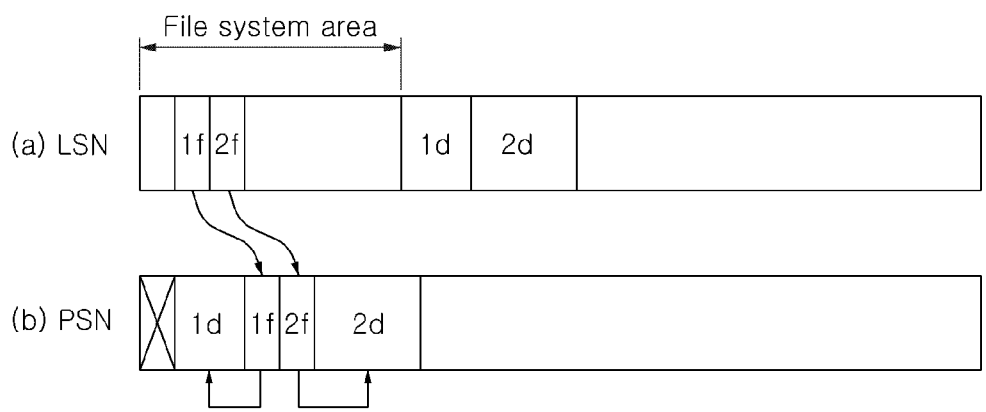

FIG. 12 shows an example in which a second file is written after the first file is written in the manner of FIG. 11. In the optical disk drive, file system data $1f$ and $2f$ of the first and second files are written to the file system area and data $1d$ and $2d$ of the first and second files are written to the data area as shown in (a) of FIG. 12.

Unlike the optical disk drive, it is necessary to invalidate the already written data in order to write data to the flash memory 300. Thus, the write/read controller 315 invalidates data corresponding to the file system area of the written first file before the second file (b) is written. Then, data $1f$ corresponding to the file system area of the first file and data $2f$ corresponding to the file system area of the second file are written to (b), and data $2d$ corresponding to the data file of the second file is written to (b).

Figure 13:
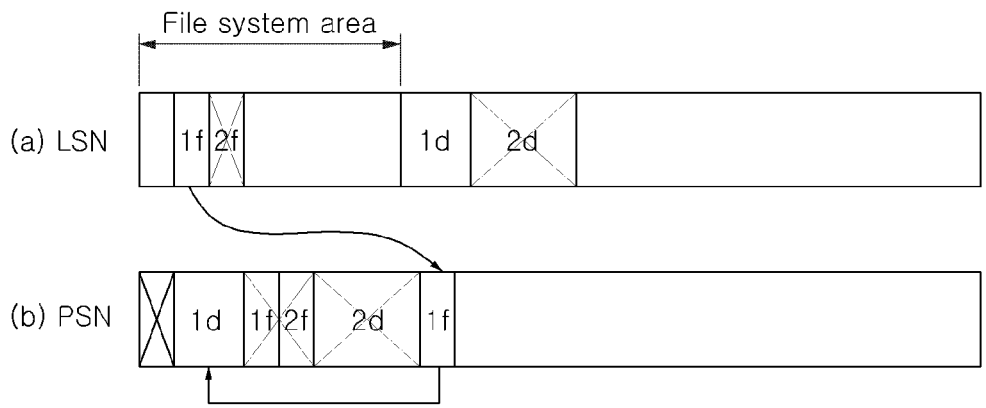
Figure 14:
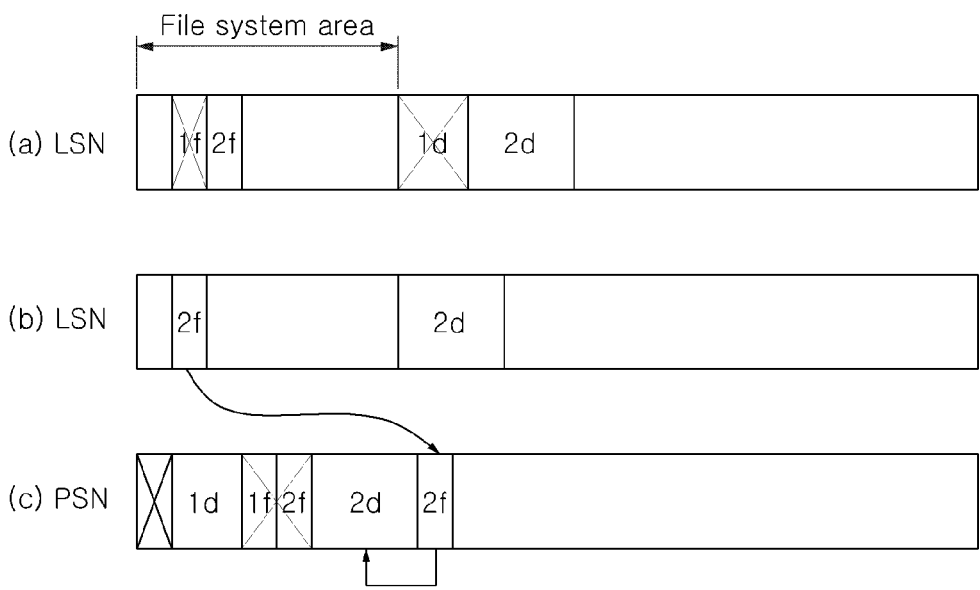

FIGS. 13 and 14 show examples in which the second and first files are erased, respectively, after the first and second files are written to the flash memory.

As shown in (a) of FIG. 13, in order to erase the second file, it is necessary to erase data $2f$ corresponding to the file system area of the second file written to the file system area and data $2d$ corresponding to the data area.

The write/read controller 315 invalidates data $1f$ and $2f$ corresponding to the file system areas of the already written first and second files so as to erase the second file. Moreover, the write/read controller 315 invalidates data $2d$ corresponding to the data area of the first file requested to be erased. Subsequently, the write/read controller 315 rewrites data $1f$ corresponding to the file system area of the first file, which is not requested to be erased, to the flash memory 300. Data $1f$ corresponding to the file system area of the first file is linked to data 1*d* corresponding to the data area of the first file.

As shown in (a) FIG. 14, in order to erase the first file, it is necessary to erase data 1*f* corresponding to the file system area of the first file written to the file system area and data 1*d* corresponding to the data area.

When the first file is erased, the positions of data 2*f* written to the file system area of the second file and data 2*d* written to the data area of the second file are changed as shown in (b) of FIG. 14.

Thus, the write/read controller 315 invalidates data 1*f* and 2*f* corresponding to the file system areas of the first and second files and invalidates data 1*d* corresponding to the data area of the first file as shown in (c) of FIG. 14. Then, data 2*f* written to the file system area of the second file is rewritten to the corresponding flash memory. Data 2*f* written to the file system area of the written second file is linked to data 2*d* written to the data area of the second file.

Figure 15:
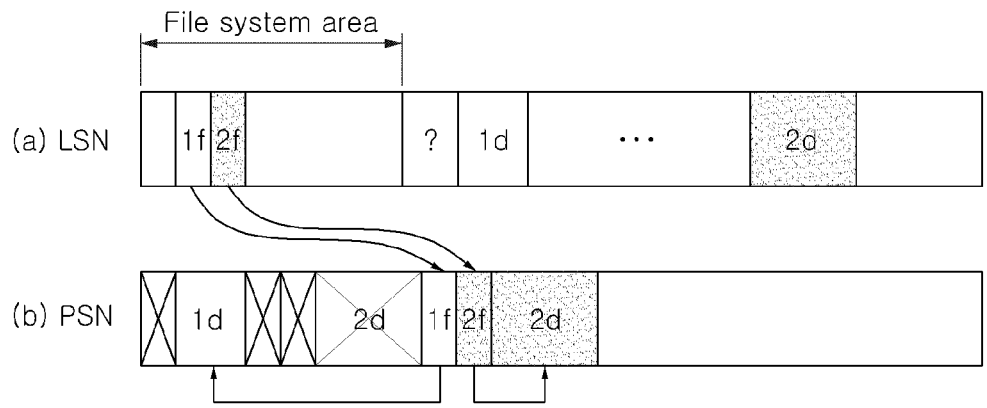
Figure 16:
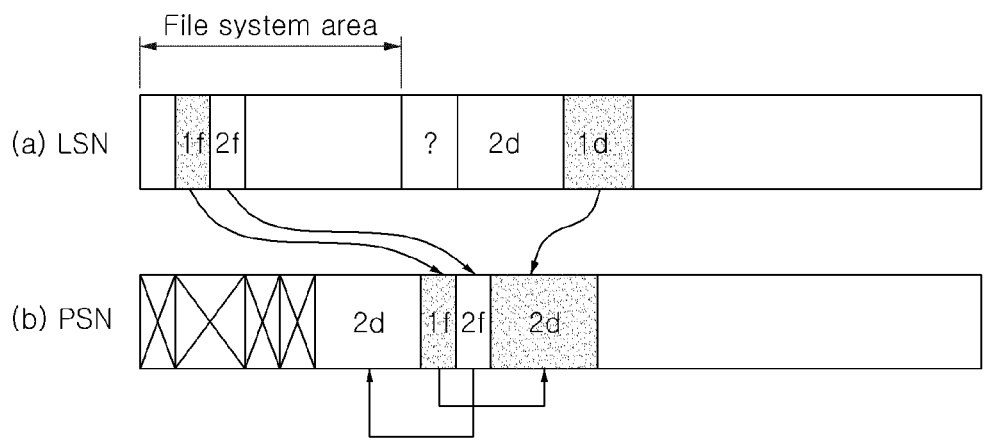

FIGS. 15 and 16 show examples in which the first and second files are updated, respectively, after the first and second files are written to a predetermined page of the flash memory.

As shown in (a) of FIG. 15, data 2*f* corresponding to the file system area of the second file is updated so as to update the second file. Moreover, data 2*d* corresponding to the data area of the second file is newly written.

As shown in (b) of FIG. 15, the write/read controller 315 invalidates data if and 2*f* corresponding to the file system areas of the first and second files before data 2*f* and 2*d* corresponding to the second file requested to be updated are written. Then, data 1*f* corresponding to the file system area of the first file, data 2*f* corresponding to the file system area of the second file that the host 100 requests to update, and data 2*d* corresponding to the data area of the second file that the host 100 requests to update, are rewritten to the flash memory.

Data 1*f* corresponding to the file system of the first file is linked to data 1*d* corresponding to the data area of the first file that has been written to the flash memory. Data 2*f* corresponding to the file system area of the second file requested to be updated is linked to data 2*d* corresponding to the data area of the second file requested to be updated.

As shown in (a) of FIG. 16, data 1*f* corresponding to the file system area of the first file is updated so as to update the first file. Moreover, data 1*d* corresponding to the data area of the first file is newly written.

As shown in (b) of FIG. 16, the write/read controller 315 invalidates data 1*f* and 2*f* corresponding to the file system areas of the first and second files before data 1*f* and 1*d* corresponding to the first file requested to be updated are written. Then, data 1*f* corresponding to the file system area of the first file that the host 100 requests to update, data 2*f* corresponding to the file system area of the second file, and data 1*d* corresponding to the data area of the first file that the host 100 requests to update are rewritten to the flash memory.

Data 2*f* corresponding to the file system of the second file is linked to data 2*d* corresponding to the data area of the second file that has been written to the flash memory. Data 1*f* corresponding to the file system area of the first file requested to be updated is linked to data 1*d* corresponding to the data area of the first file requested to be updated.

Next, a boot process from a solid state drive virtualized as an optical disk drive will be described. In the case of ROM disk drive, recordable disk drive, and rewritable disk drive among the optical disk drives, a predetermined file system such as UDF or ISO 9660 is used, and a boot image may be easily generated in accordance with EI-Torito standard. However, in the case of RAM, it is possible to support file systems (FAT32, etc.) other than UDF, a file system of the optical disk. Thus, if the solid state drive is virtualized as RAM that supports the FAT32 file system, the boot in accordance with boot standard of the optical disk drive that uses UDF or ISO 9660 file system is not available.

Even in the case where the solid state drive virtualized as RAM does not support UDF and ISO 9660 file systems, the present invention enables the boot process in accordance with the optical disk drive boot standard.

That is, in the solid state drive virtualized as RAM, a predetermined area of the flash memory is set as a hidden area in which the boot of the EI-Torito standard is possible, and the remaining area is set as a real area. When the host tries to boot, the boot process is performed in accordance with the optical disk drive boot standard based on boot data of the hidden area hidden from the user. Then, the real area of the flash memory is accessed. Thus, the user accesses only the real area of the flash memory set to RAM after the boot process. In the case where the solid state drive is virtualized as RAM that supports the FAT32 file system, the real area is accessed based on the FAT file system unlike the hidden area.

Figure 17:
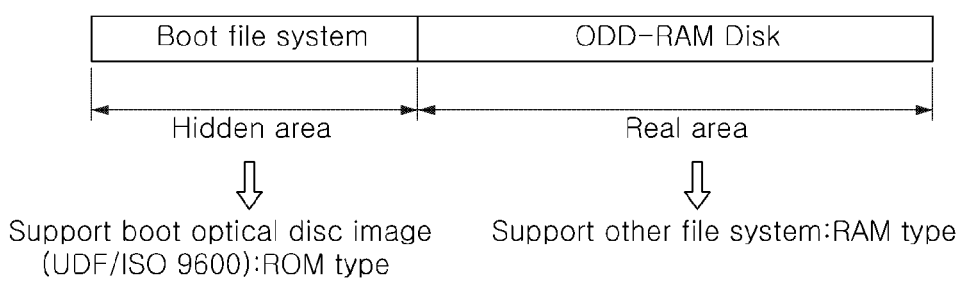
FIGS. 17 to 19 are diagrams showing a boot process from a solid state drive virtualized as a RAM disk drive in accordance with an embodiment of the present invention.

FIG. 17 shows a flash memory virtualized as RAM, in which the hidden area and the real area are individually set. As shown in FIG. 17, the hidden area in which the boot data of the boot file system is stored and the real area that supports RAM file systems are distinguished. The hidden area is accessed during boot and is not exposed to the user.

Figure 18:
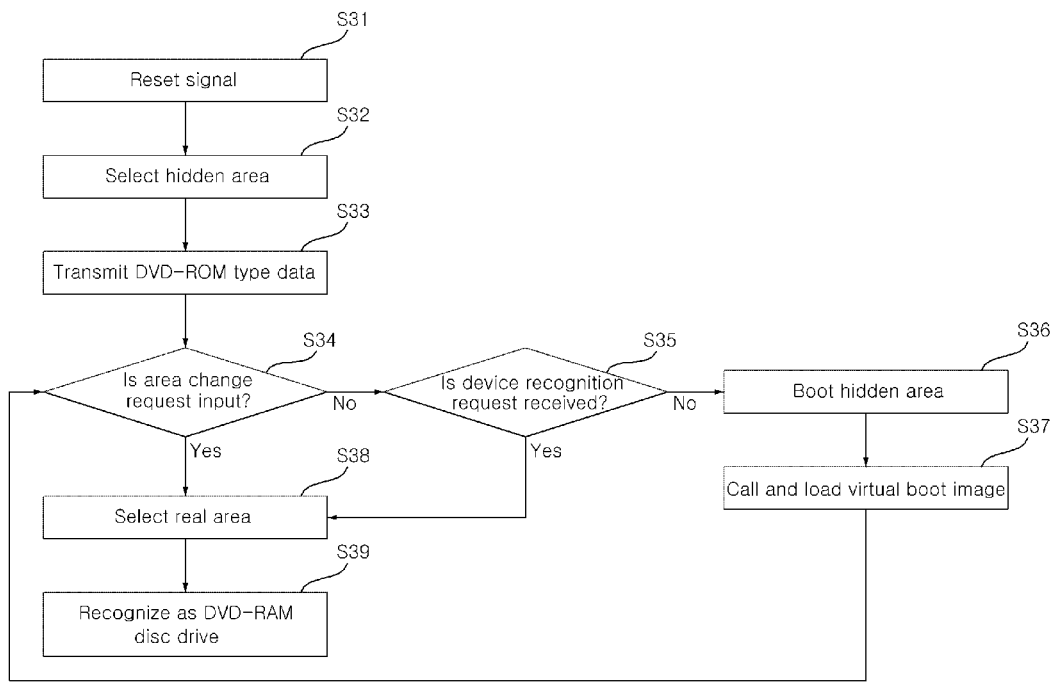

FIG. 18 is a flowchart showing a boot process from the flash memory having the structure of FIG. 17.

First, when a reset signal is transmitted from the host (S31), the hidden area of the solid state drive is accessed through default (S32). That is, a starting point of the hidden area is set as a starting address of the physical address of the flash memory 300. Data in accordance with ROM standard is transmitted to the host (S33). Unless an area change request is input (S34), it is determined whether a device recognition request is transmitted from the host (S35).

During boot, the optical disk drive does not send attribute information related to the type of device to the host, and the host directly performs the boot process based on the boot data. Thus, in the present invention, the host also tries to read the boot data before the host sends a device recognition request. In the case where the device recognition request is not transmitted, the boot address of the hidden area is called (S36).

Since the attempt to read data succeeds before the attribute information of the device is transmitted to the host, the boot process is performed. Thus, the boot data of the hidden area is loaded in the real area and then a virtual boot image is output (S37). Upon completion of the loading process, the host access area is changed from the hidden area to the real area (S34). Thus, the real area is selected from the flash memory (S38), and the address of the real area is changed into the starting point of the physical address of the flash memory. Accordingly, the host recognizes the solid state drive as a RAM disk drive (S39).

Figure 19:
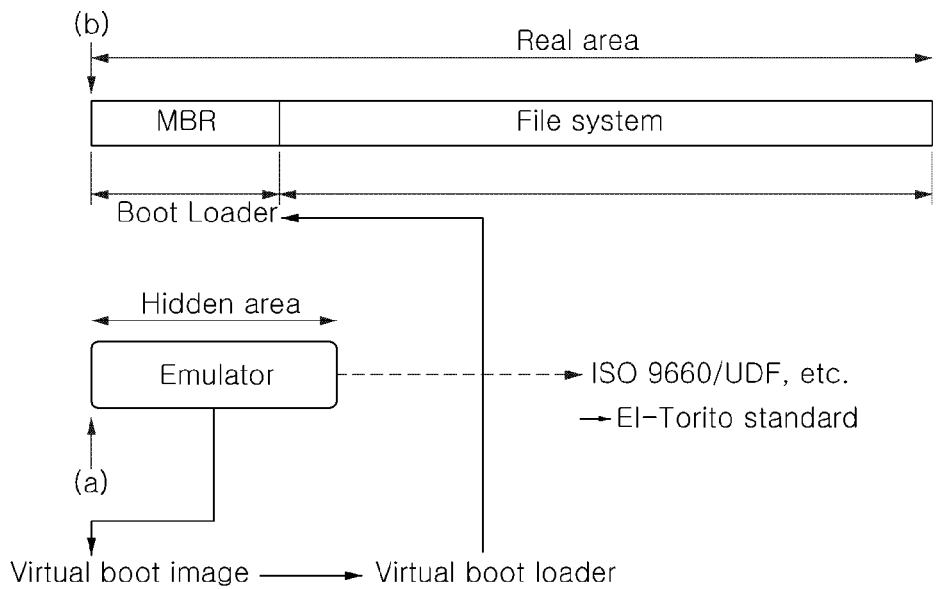

FIG. 19 is a diagram showing a boot process of a flash memory virtualized as a RAM disk drive in accordance with the present invention.

As shown in FIG. 19, since an emulator operates in the hidden area, a virtual boot image is called and loaded in the real area by a boot loader. Upon completion of the loading process, the starting point of the physical address of the flash memory is changed from starting point (a) of the hidden area to starting point (b) of the real area.

The host recognizes the solid state drive as a RAM disk drive based on the attribute information and accesses the solid state drive in the same manner as the RAM disk drive.

In concluding the detailed description, those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation.

The invention claimed is:

1. A memory drive capable of being virtualized as an optical disk drive, the memory drive comprising a storage memory and a storage memory controller for writing data to the storage memory,
wherein the storage memory controller writes or reads data to or from the storage memory based on a unit of writing/reading in accordance with an optical disk drive standard,
wherein the storage memory controller includes:
a sector manager for managing a unit of writing/reading of the storage memory based on a unit of writing/reading in accordance with the optical disk drive standard,
an attribute manager for controlling the data writability of the memory drive and transmitting attribute information related to the data writability of the memory drive to a host, and
a write/read controller for writing or reading data to or from the memory drive based on the unit of writing/reading set by the sector manager in response to a write/read operation request from the host according to the attribute information,
wherein the attribute manager assigns an attribute selected from the group consisting of a read-only memory (ROM) disk drive, a recordable disk drive, a rewritable disk drive, and a random access memory (RAM) disk drive to the memory drive and controls the data writability of the memory drive according to the assigned attribute, and
wherein if the attribute assigned to the memory drive is the RAM, each of pages that constitute the storage memory include a hidden area in which boot data in accordance with the optical disk drive standard is stored and a real area in which the boot data stored in the hidden area is loaded.

2. The memory drive of claim 1, wherein the storage memory controller writes data to the storage memory or reads data written to the storage memory by applying a file system in accordance with the optical disk drive standard to the storage memory, executes optical disk drive processing instructions of the host using processing instructions in accordance with the optical disk drive standard, and returns the result or state with respect to an instruction from the host to the host.

3. The memory drive of claim 1, wherein the type of data written to the storage memory is the same as the type of data written to an optical disk drive.

4. The memory drive of claim 1, wherein the write/read controller reads the boot data stored in the hidden area and loads the boot data in the real area in response to a device recognition request from the host before transmitting the attribute information to the host.

5. The memory drive of claim 1, wherein after the boot data is loaded in the real area, the write/read controller maps a starting point of the real area to a starting point of a physical address of the storage memory in response to a write/read request from the host.

6. The memory drive of claim 1, wherein the memory drive further comprises a jumper switch capable of selecting an attribute of the memory drive.

7. The memory drive of claim 6, wherein the attribute manager controls the data writability of the memory drive based on the attribute selected by the jumper switch.

8. The memory drive of claim 1, wherein the write/read controller sequentially writes data to the storage memory, if a logical address is sequentially accessed when the host writes data, and stores information related to a difference between the logical address and the physical address of the storage memory to which data is written.

9. The memory drive of claim 1, wherein if the logical address is not sequentially accessed when the host writes data, the write/read controller further comprises a buffer in which data that the host wants to write is stored, sequentially writes data stored in the buffer to the storage memory, and stores a table that maps the accessed logical address to the physical address of the storage memory to which data is written.

10. The memory drive of claim 1, wherein if the storage memory is a flash memory, when the host requests to write a first file divided into a file system area and a data area, the write/read controller writes data corresponding to the file system area to the flash memory and writes data corresponding to the data area to the flash memory to which the data corresponding to the file system area is written.

11. The memory drive of claim 10, wherein when the host requests to write a second file divided into a file system area and a data area, the write/read controller invalidates the file system area of the first file in the page, and writes data corresponding to the file system area of the first file, data corresponding to the file system area of the second file, and data corresponding to the data area of the second file to the flash memory.

12. The memory drive of claim 11, wherein when the host requests to update the first or second file, the write/read controller invalidates the data area of the file requested to be updated and the file system areas of the first and second files, and writes data corresponding to the file system areas of the first and second files transmitted from the host and data corresponding to the data area of the file requested to be updated to the flash memory.

13. The memory drive of claim 11, wherein when the host requests to erase the first or second file, the write/read controller invalidates the file system areas of the first and second files and the data area of the file requested to be erased, and writes the file system of the file that is not requested to be erased to the flash memory.

14. A method of virtualizing a memory drive as an optical disk drive, the memory drive including a storage memory and a storage memory controller that writes data to the storage memory, the method comprising the steps of:
transmitting attribute information related to the data writability of the memory drive in response to a device recognition request from a host;
writing or reading data to or from the storage memory based on a unit of writing/reading in accordance with an optical disk drive standard in response to a write/read operation request from the host according to the attribute information;
assigning an attribute selected from the group consisting of a read-only memory (ROM) disk drive, a recordable disk drive, a rewritable disk drive, and a random access memory (RAM) disk drive to the memory drive, wherein the data writability of the memory drive is controlled according to the assigned attribute; and dividing each of pages that constitute the storage memory into a hidden area in which boot data in accordance with the optical disk drive standard is stored and a real area in which the boot data stored in the hidden area is loaded, in the case where the attribute assigned to the memory drive is the RAM.

15. The method of claim 14, wherein the transmitting step and the writing or reading step execute optical disk drive processing instructions of the host using processing instructions in accordance with the optical disk drive standard.

16. The method of claim 14, wherein the writing or reading step writes data to the storage memory or reads data written to the storage memory by applying a file system in accordance with the optical disk drive standard to the storage memory.

17. The method of claim 14, wherein in the writing or reading step, the type of data written to the storage memory is the same as the type of data written to an optical disk drive.

18. The method of claim 14, wherein the step of transmitting the attribute information loads the boot data, stored in the hidden area, in the real area before transmitting the attribute information to the host.

19. The method of claim 14, further comprising the step of mapping a starting point of the real area to a starting point of a physical address of the storage memory in response to a write/read request from the host after the boot data is loaded in the real area.

20. The method of claim 14, wherein the writing or reading step sequentially writes data to the storage memory, if a logical address is sequentially accessed when the host writes data, and stores information related to a difference between the logical address and the physical address of the storage memory to which data is written.

21. The method of claim 14, wherein if the logical address is not sequentially accessed when the host writes data, the writing or reading step stores data that the host wants to write in a buffer, sequentially writes data stored in the buffer to the storage memory, and stores a table that maps the accessed logical address to the physical address of the storage memory to which data is written.

22. The method of claim 14, wherein if the storage memory is a flash memory, when the host requests to write a first file divided into a file system area and a data area, the write/read step writes data corresponding to the file system area to the flash memory and writes data corresponding to the data area to the flash memory to which the data corresponding to the file system area is written.

23. The method of claim 22, wherein when the host requests to write a second file divided into a file system area and a data area, the write/read controller invalidates the file system area of the first file in the page, and writes data corresponding to the file system area of the first file, data corresponding to the file system area of the second file, and data corresponding to the data area of the second file to the flash memory.

24. The method of claim 23, wherein when the host requests to update the first or second file, the write/read controller invalidates the data area of the file requested to be updated and the file system areas of the first and second files, and writes data corresponding to the file system areas of the first and second files transmitted from the host and data corresponding to the data area of the file requested to be updated to the flash memory.

25. The method of claim 23, wherein when the host requests to erase the first or second file, the write/read controller invalidates the file system areas of the first and second files and the data area of the file requested to be erased, and writes the file system of the file that is not requested to be erased to the flash memory.

* * * * *